United States Patent
Grün et al.

(10) Patent No.: US 11,761,806 B2
(45) Date of Patent: Sep. 19, 2023

(54) THERMAL FLOWMETER

(71) Applicant: Endress+Hauser Flowtec AG, Reinach (CH)

(72) Inventors: Alexander Grün, Lörrach (DE); Mathieu Habert, Rixheim (FR)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 17/617,025

(22) PCT Filed: May 4, 2020

(86) PCT No.: PCT/EP2020/062250
§ 371 (c)(1),
(2) Date: Dec. 7, 2021

(87) PCT Pub. No.: WO2020/244856
PCT Pub. Date: Dec. 10, 2020

(65) Prior Publication Data
US 2022/0341767 A1 Oct. 27, 2022

(30) Foreign Application Priority Data

Jun. 7, 2019 (DE) .................... 10 2019 115 558.4

(51) Int. Cl.
*G01F 1/684* (2006.01)
(52) U.S. Cl.
CPC ............ *G01F 1/6842* (2013.01); *G01F 1/684* (2013.01)

(58) Field of Classification Search
CPC ............................. G01F 1/6842; G01F 1/684
See application file for complete search history.

(56) References Cited

U.S. PATENT DOCUMENTS

| | | | | |
|---|---|---|---|---|
| 3,366,942 A | * | 1/1968 | Deane | G01P 13/006 73/204.11 |
| 6,227,045 B1 | * | 5/2001 | Morse | G01F 1/68 73/204.25 |
| 9,528,868 B2 | * | 12/2016 | Kharsa | F17D 5/06 |
| 9,835,487 B2 | * | 12/2017 | Kurz | G01F 1/74 |

(Continued)

FOREIGN PATENT DOCUMENTS

| | | | | |
|---|---|---|---|---|
| DE | 19547915 A1 | 6/1997 | | |
| DE | 202015100058 U1 | * | 3/2015 | ............. G01F 1/684 |

(Continued)

*Primary Examiner* — Ryan D Walsh
(74) *Attorney, Agent, or Firm* — Christopher R. Powers; Endress+Hauser (USA) Holding, Inc.

(57) ABSTRACT

A thermal flowmeter for measuring the mass flow rate of a medium in a measuring tube, includes: a measuring tube having a measuring tube wall; a sensor having four probes that project into the measuring tube from a main sensor body; and an electronic measuring/operating circuit designed to operate at least three probes and to generate and provide flow measurement values by operating the probes, each probe having a main probe body and an active probe body, the active probe body designed to heat the medium, to determine the temperature of the medium and/or to influence a flow of the medium in the measuring tube, wherein the main probe bodies span a rhombus on a surface of the main sensor body, and the rhombus is defined by centroid points of cross-sections of the main probe bodies.

14 Claims, 4 Drawing Sheets

(56) References Cited

U.S. PATENT DOCUMENTS

| | | | | |
|---|---|---|---|---|
| 11,280,650 | B2 * | 3/2022 | Grün | G01F 1/684 |
| 2011/0048564 | A1 * | 3/2011 | Wible | G01F 1/6842 |
| | | | | 138/37 |
| 2015/0192445 | A1 * | 7/2015 | Olin | G01F 15/024 |
| | | | | 702/45 |
| 2018/0313679 | A1 | 11/2018 | Schultheis et al. | |

FOREIGN PATENT DOCUMENTS

| | | | | |
|---|---|---|---|---|
| DE | 102014114940 A1 | | 4/2016 | |
| DE | 102014119231 A1 * | | 6/2016 | G01F 1/6842 |
| DE | 102015118123 A1 | | 4/2017 | |
| EP | 0180974 A1 | | 5/1986 | |
| WO | WO-2019170397 A1 * | | 9/2019 | G01F 1/684 |

* cited by examiner

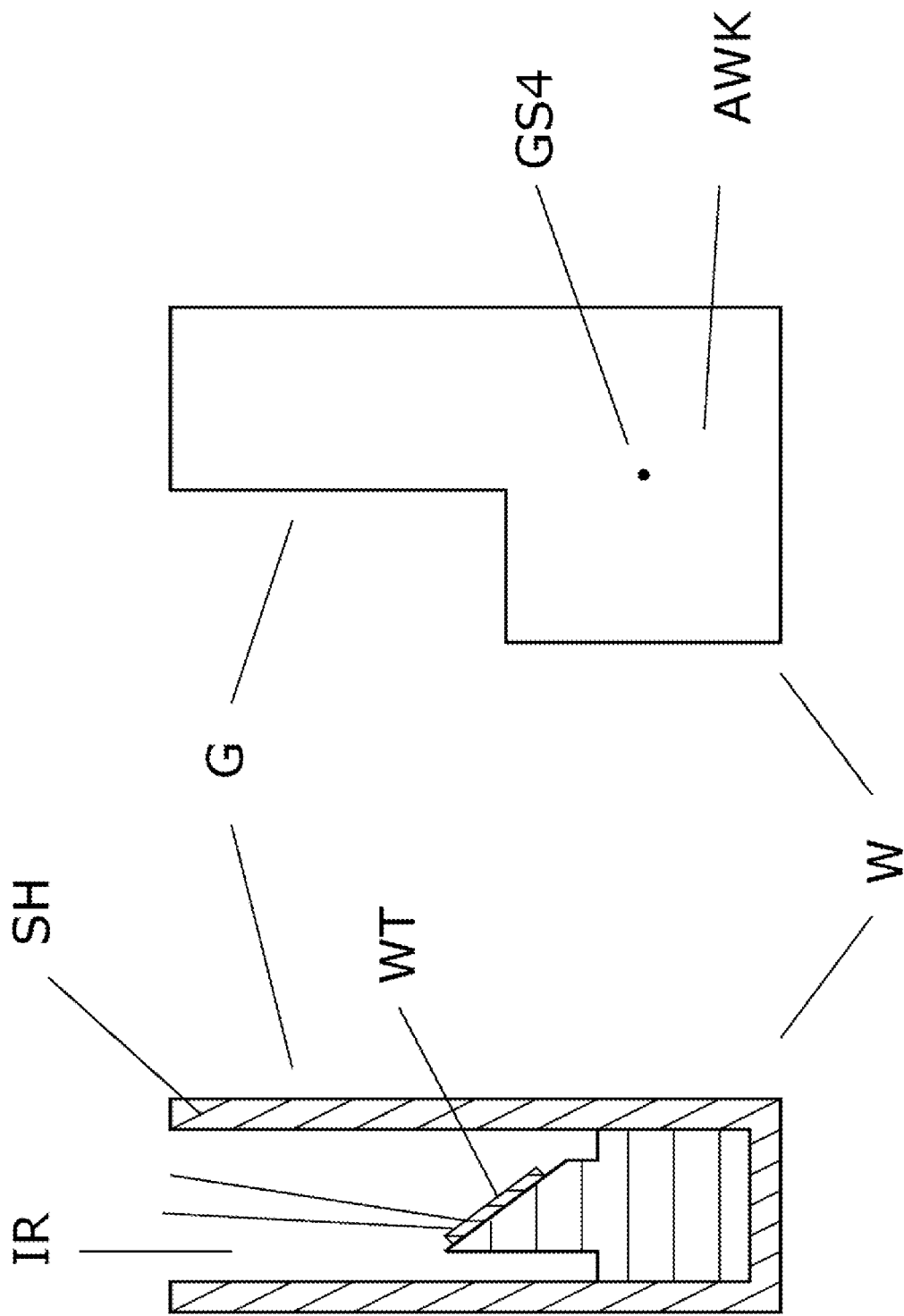

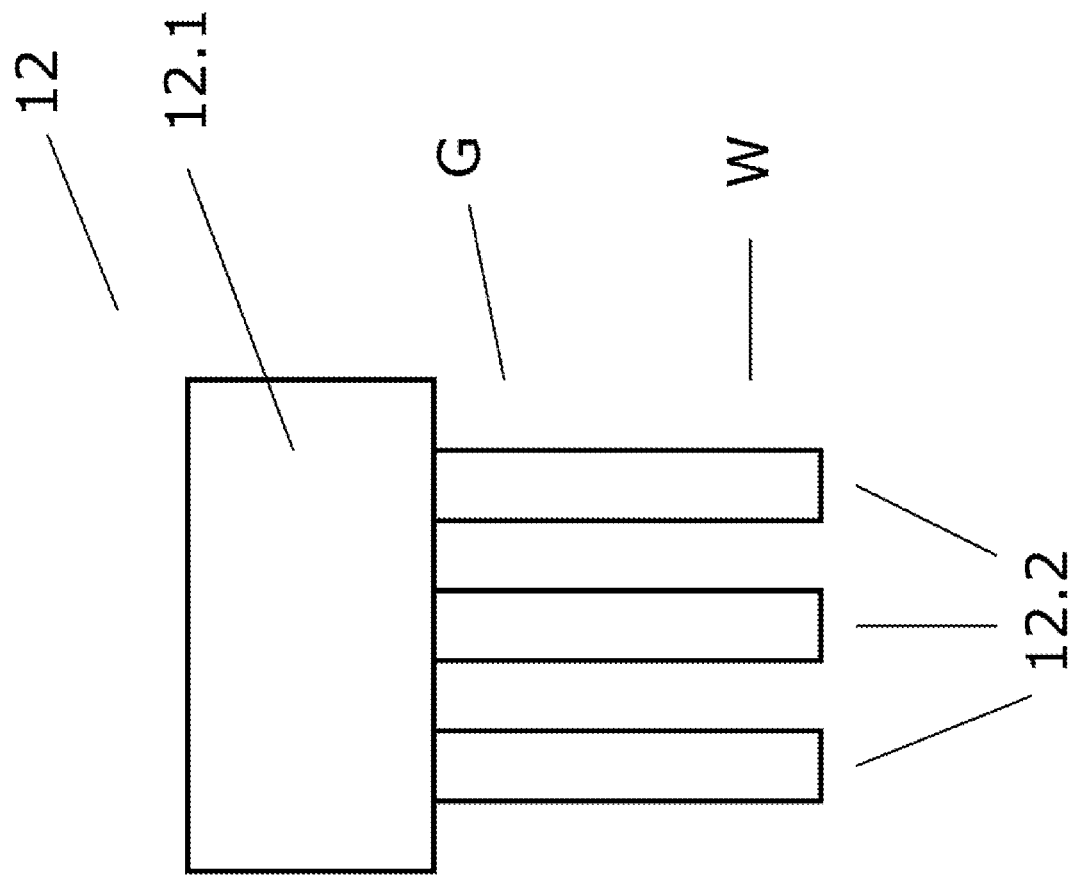

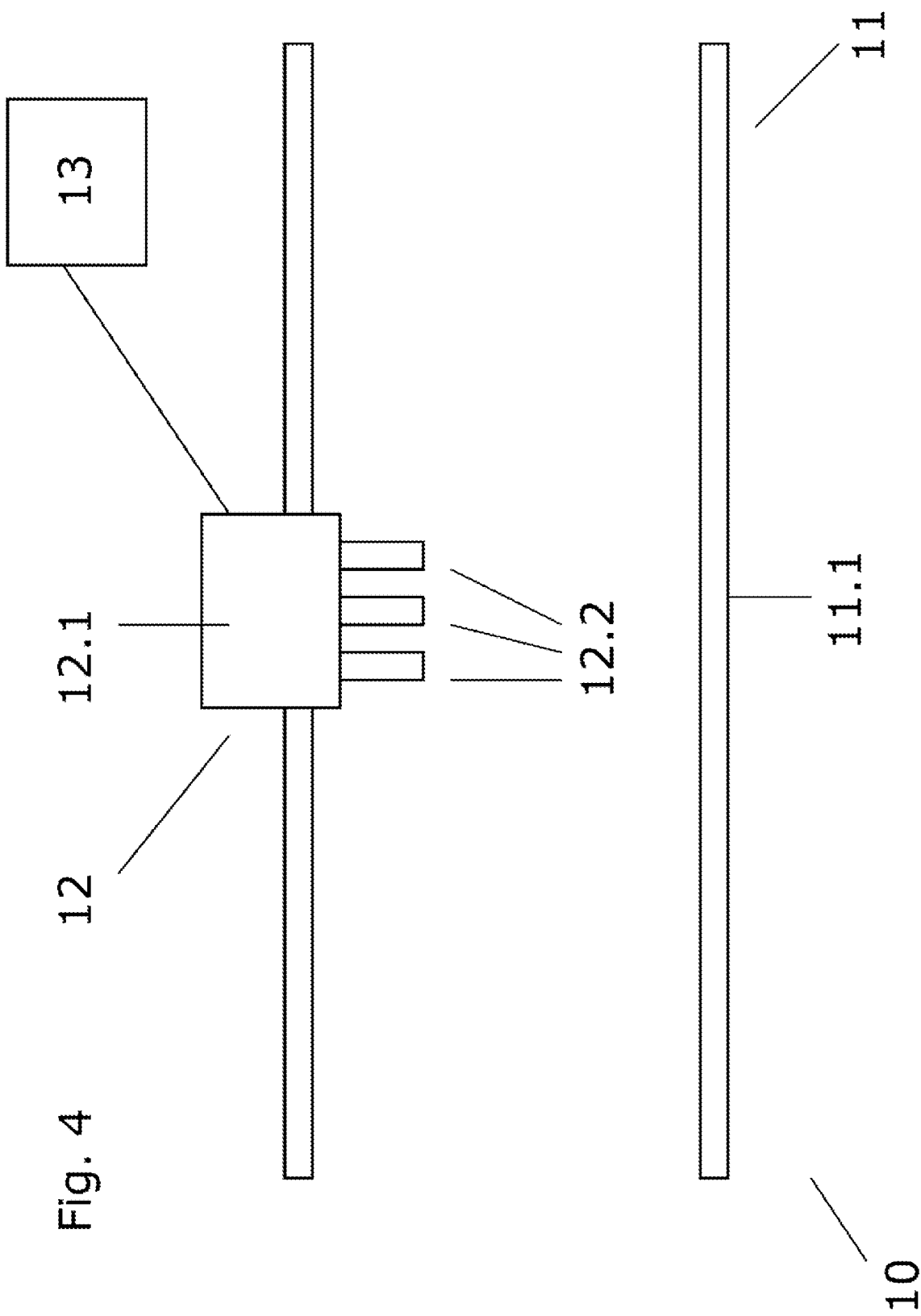

THERMAL FLOWMETER

CROSS-REFERENCE TO RELATED APPLICATIONS

The present application is related to and claims the priority benefit of German Patent Application No. 10 2019 115 558.4, filed on Jun. 7, 2019, and International Patent Application No. PCT/EP2020/062250, filed May 4, 2020, the entire contents of which are incorporated herein by reference.

TECHNICAL FIELD

This invention relates to a thermal flowmeter and a method for operating a thermal flowmeter.

BACKGROUND

The thermal flow measurement is based upon the fact that, via an energy input via a probe into a medium flowing past the probe or via the temperature of a heated probe located in the medium, conclusions can be drawn about the mass flow of the medium. However, the direction in which the medium flows cannot be derived from the energy input or from the temperature of the probe.

Publication DE102015118123A1 shows a sensor of a thermal flowmeter which is immersed in a measuring tube of the flowmeter and has several probes which are designed either to heat the medium and to measure their own temperature or to measure the temperature of the medium. Furthermore, a flow resistance is configured to effect a direction-dependent incident flow of a heatable probe in order to be able to derive a clear directional specification of the flow of the medium in the measuring tube from the direction dependence of the incident flow. However, it has been shown that, at low to medium flow velocities, a specification of the flow direction is accompanied by a high degree of uncertainty.

SUMMARY

The aim of the invention is therefore to propose a flowmeter by means of which a reliable detection of the flow direction of the medium in the measuring tube is facilitated.

The aim is achieved by a thermal flowmeter according to independent claim 1.

A flowmeter according to the invention for measuring the mass flow of a medium in a measuring tube comprises:
- a measuring tube having a measuring tube wall;
- a sensor having four probes, which probes project into the measuring tube starting from a main sensor body, wherein the probes are designed to heat the medium, to determine the temperature of the latter, or to influence a flow of the medium in the measuring tube;
- an electronic measuring/operating circuit which is designed to operate at least three probes and, by means of their operation, to create and provide flow measurement values,
- wherein each probe has a main probe body and an active probe body, wherein the main probe body is arranged in each case on a side, facing the main sensor body, of the corresponding probe, and wherein the active body is arranged in each case on a side, facing away from the main sensor body, of the corresponding probe,
- wherein the active probe body is designed to heat the medium, to determine the temperature of the medium, and/or to influence a flow of the medium in the measuring tube,
- wherein the main probe bodies are columnar,
- wherein the main probe bodies span a rhombus on a surface of the main sensor body, wherein the rhombus is defined by the centroid points of cross-sections of the main probe bodies and has a first diagonal and a second diagonal,
- wherein a first probe is configured to measure the temperature of the medium,
- wherein a second probe and a third probe are configured to heat the medium and to determine the temperature of the latter in each case,
- wherein the first probe is arranged on a first side of the first diagonal, and wherein the third probe is arranged on a second side of the first diagonal, wherein the second and a fourth probe are arranged on opposite sides of the second diagonal,
- wherein a first diagonal of the rhombus has an angle of rotation q to a normal of a measuring tube cross-section,
- wherein η is greater than 1 degree, and especially greater than 2 degrees, and preferably greater than 3 degrees.

This probe arrangement achieves a high symmetry of the arrangement in relation to flow resistances of the sensor with respect to both possible flow directions of the medium in the measuring tube.

It has surprisingly been shown that a slight rotation of the main sensor body exhibits significantly better flow direction detection over a wide range of speeds. A rotation of the sensor has an advantageous effect, particularly at high flow velocities greater than 70 m/s.

The flowmeter is preferably used for measuring the flow of gases.

In this case, columnar means that the main probe body protrudes from the main sensor body and, in particular, has a longitudinal axis symmetry. The following applies for a length l along the longitudinal axis and a volume V of the main probe body: $(l^3/V)^{0.5}$ greater than $2^{0.5}$, and in particular greater than 2.

In one embodiment, q is less than 20 degrees, and especially less than 15 degrees and preferably less than 10 degrees. It is important here that a probe located in a flow shadow, i.e., the first probe or the third probe, depending upon the flow direction, remain completely in the flow shadow formed from the second probe and the fourth probe.

In one embodiment, a fourth probe is designed to impede a partial flow of the medium between the first probe and the third probe.

The transfer of heat from the heating probes to the medium is low enough that the first probe detects the temperature of the medium to a good approximation, unaffected by the transfer of heat and independently of the flow direction of the medium. A first temperature difference between the first probe and the second probe is suitable for use in measuring the flow velocity of the medium. A second temperature difference between the first probe and the third probe is suitable for use in measuring the flow direction. For example, with the same heat output of the second probe and of the third probe, it can be concluded, in case of a second temperature difference that is greater than the first temperature difference, that the third probe is in the flow shadow. However, for example, a time curve of the first temperature difference and of the second temperature difference can also be used to assign expected temperatures to flow measurement values for both flow directions. In this case, the heat output of the third probe may differ from the heat output of the second probe.

In one embodiment, the active probe body of the fourth probe has a first width along the first diagonal and a second width along the second diagonal, wherein the second width is greater than the first width by a factor of at least 1.1, and particularly at least 1.2, and preferably at least 1.3, and wherein a geometric center of the active probe body of the fourth probe is offset in the direction of the second probe.

In this way, a heat flow from the third probe to the first probe can be at least partially prevented, which improves the measurement of the flow.

In one embodiment, an outer surface of the active probe body of the fourth probe is symmetrical with respect to the second diagonal.

In one embodiment, the first probe, the second probe, and the third probe each comprise a probe sleeve, wherein the flowmeter has resistance thermometers, wherein a resistance thermometer is arranged in each case in interior spaces encompassed by the probe sleeves, which resistance thermometer is designed to detect a temperature or to emit thermal energy.

In one embodiment, the fourth probe is solid.

In one embodiment, an internal angle, belonging to the first probe, of the rhombus is less than 90°, and in particular less than 75°, and preferably less than 60°.

This ensures a reduced flow resistance of the sensor in the measuring tube and good incident flow of the probes.

In one embodiment, a centroid point of a cross-section of the main probe body of the fourth probe is at a second distance from a centroid point of a cross-section of the main probe body of the second probe.

wherein a minimum distance of the outer surface of the active probe body of the fourth probe from an outer surface of the active probe body of the second probe is less than 30%, and in particular less than 15% and preferably less than 5%, of the second distance.

In one embodiment, a first outer diameter of the first probe, of the second probe, and of the third probe in the respective active regions is at least 1 mm, and in particular 1.5 mm and preferably at least 2 mm, and/or at most 7 mm, and in particular at most 5 mm and preferably at most 4 mm.

In one embodiment, a centroid point of a cross-section of the main probe body of the first probe is at a first distance from a centroid point of a cross-section of the main probe body of the third probe, wherein the first distance is at least two, first external diameters.

In one embodiment, cross-sections of the first probe, of the second probe, and of the third probe have a round contour, at least in certain regions of the active probe bodies.

Round contours result in easier production and flow resistances that are independent of the direction of flow.

BRIEF DESCRIPTION OF THE DRAWINGS

The invention will now be described with reference to schematic exemplary embodiments.

FIG. 2a shows a cross-section through an exemplary first, second, or third probe; and FIG. 2b shows a side view of an exemplary fourth probe; and FIG. 3 shows a side view of a sensor according to the invention present disclosure; and FIG. 4 sketches shows a structure of an exemplary schematic thermal flowmeter according to the invention present disclosure.

DETAILED DESCRIPTION

Figure 1:
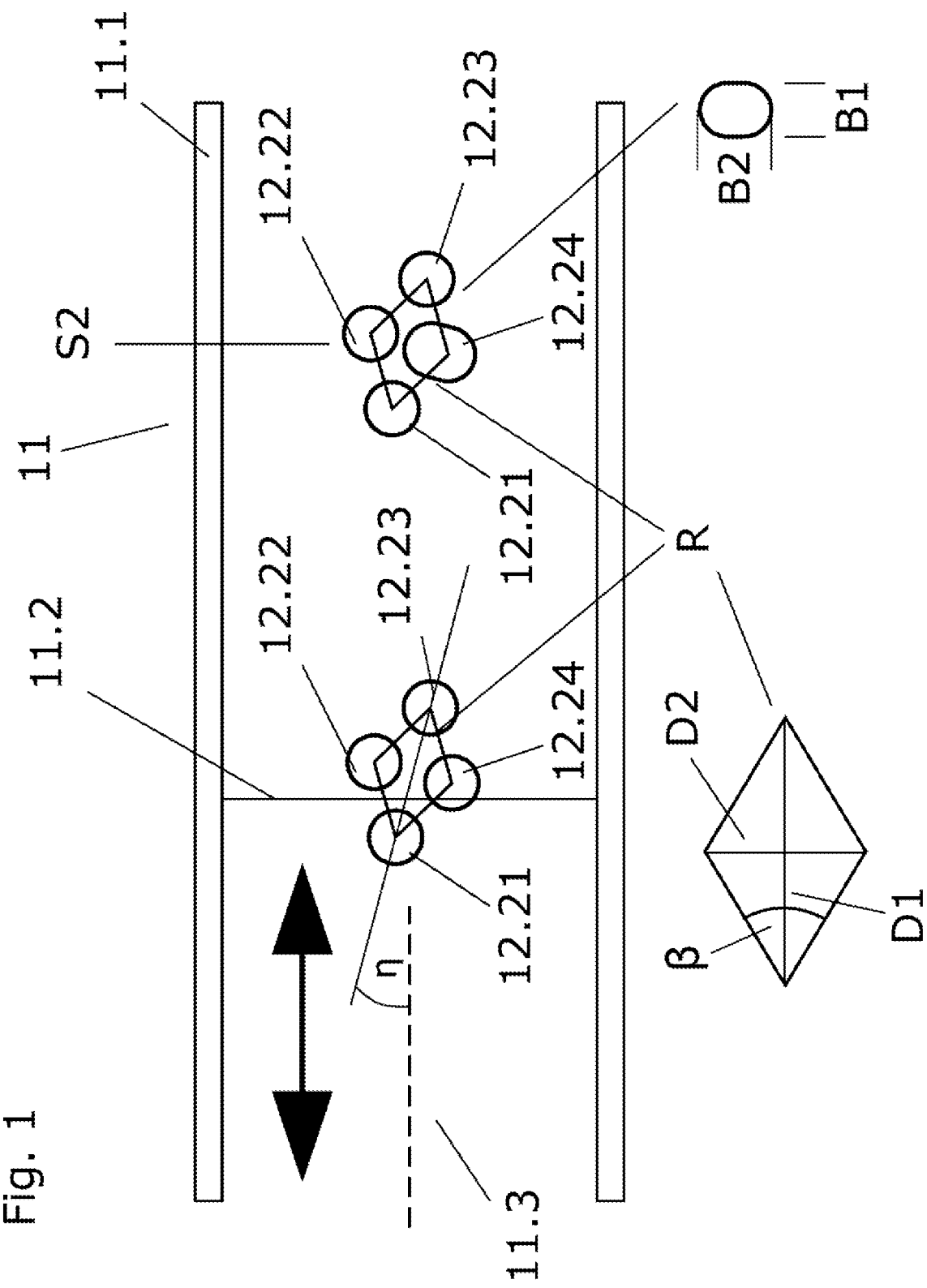
FIG. 1 shows active regions of two exemplary probe arrangements according to the invention present disclosure of a thermal flowmeter and orientations of said probes in a measuring tube.

FIG. 1 shows active regions of two probe arrangements according to the invention in a measuring tube 11 with a measuring tube wall 11.1 each having a first probe 12.21, a second probe 12.22, a third probe 12.23, and a fourth probe 12.24. The active regions are the regions in which active probe bodies W, (see FIGS. 2 a), 2 b), and 3)) are effective. The active probe bodies each connect to a main probe body G of the corresponding probe, which main probe bodies are connected to a main sensor body 12.1 (see FIGS. 2 a), 2 b), and 3)). The action of the active probe bodies is to heat the medium, to determine the temperature of the medium, and/or to influence a flow of the medium in the measuring tube.

The main probe bodies of a probe arrangement span a rhombus R, wherein the rhombus is defined by the centroid points of cross-sections of the main probe bodies and has a first diagonal D1 and a second diagonal D2. A first probe 12.21 is designed to measure the temperature of the medium, wherein a second probe 12.22 and a third probe 12.23 are designed to heat the medium and to determine the temperature of the latter in each case, wherein the first probe is arranged on a first side of the first diagonal, and wherein the third probe is arranged on a second side of the first diagonal, wherein the second and a fourth probe 12.24 are arranged on opposite sides of the second diagonal, According to the invention, the first diagonal D1 of the rhombus has an angle of rotation q to a normal 11.3 of a measuring tube cross-section 11.2, wherein $\eta$ is greater than 1 degree, and especially greater than 2 degrees and preferably greater than 3 degrees.

It has surprisingly been shown that a slight rotation of the main sensor body exhibits significantly better flow direction detection over a wide range of speeds. A rotation of the sensor has an advantageous effect, particularly at high flow velocities greater than 70 m/s.

In one embodiment, $\eta$ is less than 20 degrees, and especially less than 15 degrees and preferably less than 10 degrees. It is important here that a probe located in a flow shadow, i.e., the first probe or the third probe, depending upon the flow direction, remain completely in the flow shadow formed from the second probe and the fourth probe.

An internal angle $\beta$ associated with the first probe is less than 90 degrees, so that the probe arrangement has a low flow resistance.

In a first probe arrangement according to the invention, the fourth probe 12.24, like the other probes, has a round contour in its active region. In this way, a sensor with the probes can be manufactured cost-effectively. In a second probe arrangement according to the invention, the fourth probe 12.24 has a non-round contour in its active region, wherein the probe has a first width B1 parallel to the first diagonal D1 and a second width B2 parallel to the second diagonal D2, wherein the second width is at least 10% greater than the first width. A geometric center GS4 (see FIG. 2 b)) of the active probe body of the fourth probe is offset in the direction of the second probe. A partial blocking effect for a flow of a medium through the measuring tube in the active regions of the probes along the second diagonal D2 is thereby achieved. As a result, an influence on the first probe by the third probe 12.23 heating the medium can be reduced, and a measuring accuracy of the sensor can thus be increased. A centroid point of a cross-section of the main probe body of the fourth probe thereby is at a second distance from a centroid point of a cross-section of the main probe body of the second probe. A minimum distance of the outer surface of the active probe body of the fourth probe from an outer surface of the active probe body of the second probe is less than 30%, and in particular less than 15% and preferably less than 5%, of the second distance.

FIG. 2 *a*) shows a longitudinal section through an exemplary first, second, or third probe, wherein a probe sleeve SH defines an interior space IR of the probe, in which interior space the probe has a resistance thermometer WT. The resistance thermometer is thereby thermally and mechanically coupled to the probe sleeve via a contact means. The contact means can, for example, be a molten material that is melted during the production of the probe and, after solidification, subsequently processed.

FIG. 2 *b*) shows a plan view, perpendicular to a measuring tube cross-section, of an exemplary fourth probe, which is widened in its active region W, and thus has an enlarged outer surface AWK. A geometric center GS4 of the active probe body of the fourth probe is thereby offset from a longitudinal axis of the main body.

FIG. 3 shows a schematic side view of a sensor 12 of a thermal flowmeter, which sensor has a main sensor body 12.1 and probes 12.2, wherein the probes, as described in FIGS. 2 *a*) and b), each comprise a main probe body G and an active probe body W.

FIG. 4 outlines a schematic structure of a thermal flowmeter 10 according to the invention having a measuring tube 11 with a measuring tube wall 11.1, a sensor 12 with a main sensor body 12.1 and with probes 12.2, and an electronic measuring/operating circuit 13 for operating the sensor and providing flow measurement values. The main sensor body is attached in a medium-tight manner in the measuring tube wall. The active regions of the probes are preferably arranged in a flow region of the medium, in which flow region a local mass flow deviates less than 10%, and especially less than 5% and preferably less than 2%, from a mean value formed over a flow cross-section.

The invention claimed is:

1. A flow measuring device for measuring the mass flow of a medium in a measuring tube, the device comprising:
    a measuring tube including a measuring tube wall;
    a sensor including four probes that extend into the measuring tube from a main sensor body, wherein the probes are configured to heat the medium, to determine a temperature of the medium, or to influence a flow of the medium in the measuring tube;
    an electronic measuring/operating circuit configured to operate at least three of the probes and to generate and provide flow measurement values by operating the probes,
    wherein each probe has a main probe body and an active probe body, wherein each main probe body is disposed on a side of the corresponding probe opposite the main sensor body, and wherein each active probe body is disposed on a side of the corresponding probe facing away from the main sensor body,
    wherein each active probe body is configured to heat the medium, to determine the temperature of the medium, and/or to influence a flow of the medium in the measuring tube,
    wherein the main probe bodies are columnar,
    wherein the main probe bodies span a rhombus on a surface of the corresponding main sensor body, wherein the rhombus is defined by centroid points of cross-sections of the main probe bodies, the rhombus having a first diagonal and a second diagonal,
    wherein a first probe of the four probes is configured to measure the temperature of the medium,
    wherein a second probe and a third probe of the four probes are configured to heat the medium and to determine a temperature of the medium respective second probe and/or third probe,
    wherein the first probe is arranged on a first side of the first diagonal, and wherein the third probe is arranged on a second side of the first diagonal, wherein the second probe and a fourth probe of the four probes are arranged on opposite sides of the second diagonal,
    wherein the first diagonal of the rhombus has an angle of rotation to a normal of a measuring tube cross-section, wherein the angle of rotation is greater than 1 degree,
    wherein the fourth probe is configured to impede a partial flow of the medium between the first probe and the third probe,
    wherein the active probe body of the fourth probe has a first width parallel to the first diagonal and a second width parallel to the second diagonal, wherein the second width is greater than the first width by a factor of at least 1.1, and
    wherein a geometric center of the active probe body of the fourth probe is offset in a direction of the second probe.

2. The device of claim 1, wherein the angle of rotation is greater than 3 degrees.

3. The device of claim 1, wherein the angle of rotation is less than 20 degrees.

4. The device of claim 1, wherein the angle of rotation is less than 10 degrees.

5. The device of claim 1, wherein an outer surface of the active probe body of the fourth probe is symmetrical with respect to the second diagonal.

6. The device of claim 1, wherein the first probe, the second probe, and the third probe each comprise a probe sleeve,
    the device further comprising resistance thermometers, wherein at least one resistance thermometer is disposed in an interior space of each respective probe sleeve of the first, second, and third probes, wherein the resistance thermometers are configured to detect a temperature or to emit thermal energy.

7. The device of claim 1, wherein the fourth probe is solid.

8. The device of claim 1, wherein an internal angle of the rhombus, belonging to the first probe, is less than 90°.

9. The device of claim 1, wherein a centroid point of a cross-section of the main probe body of the fourth probe is at a first distance from a centroid point of a cross-section of the main probe body of the second probe,
    wherein a minimum distance of an outer surface of the active probe body of the fourth probe from an outer surface of the active probe body of the second probe is less than 30% of the first distance.

10. The device of claim 9, wherein the minimum distance of the outer surface of the active probe body of the fourth probe from the outer surface of the active probe body of the second probe is less than 5% of the first distance.

11. The device of claim 1, wherein in an active region of the respective active probe body of each of the first probe, the second probe, and the third probe, an outer diameter of each respective active region is at least 1 mm and/or at most 7 mm.

12. The device of claim 11, wherein the outer diameter of each respective active region is at least 2 mm and/or at most 4 mm.

13. The device of claim 1, wherein a centroid point of a cross-section of the main probe body of the first probe is at a second distance from a centroid point of a cross-section of the main probe body of the third probe,
   wherein the second distance is at least two, first external diameters.

14. The device of claim 1, wherein cross-sections of the first probe, of the second probe, and of the third probe have a round contour, at least in regions of each respective active probe body.

* * * * *